United States Patent
Merrill et al.

(10) Patent No.: US 7,169,429 B2
(45) Date of Patent: Jan. 30, 2007

(54) PROCESS OF MAKING A HOMOGENEOUS CHEESE

(75) Inventors: Richard Kevin Merrill, Highlands Ranch, CO (US); Terry Leroy Anderson, Littleton, CO (US)

(73) Assignee: Leprino Foods Company, Denver, CO (US)

( * ) Notice: Subject to any disclaimer, the term of this patent is extended or adjusted under 35 U.S.C. 154(b) by 285 days.

(21) Appl. No.: 10/300,019

(22) Filed: Nov. 20, 2002

(65) Prior Publication Data

US 2004/0096564 A1 May 20, 2004

(51) Int. Cl.
*A23C 19/00* (2006.01)

(52) U.S. Cl. ............... 426/582; 426/518; 426/520; 426/580

(58) Field of Classification Search ........... 426/518, 426/520, 580, 582
See application file for complete search history.

(56) References Cited

U.S. PATENT DOCUMENTS

| | | | |
|---|---|---|---|
| 3,101,540 A | 8/1963 | Dzenis et al. | 31/42 |
| 4,919,943 A | 4/1990 | Yee et al. | 426/39 |
| 5,225,220 A | 7/1993 | Gamay | 426/39 |
| 5,470,595 A | 11/1995 | Kopp | 426/231 |
| 5,902,625 A | 5/1999 | Barz et al. | 426/582 |
| 5,925,398 A | 7/1999 | Rizvi et al. | 426/582 |
| 6,120,809 A | 9/2000 | Rhodes et al. | 426/36 |
| 6,319,526 B1 | 11/2001 | Dahlstrom et al. | 426/36 |
| 6,440,481 B1 | 8/2002 | Gascoigne et al. | 426/582 |
| 6,475,538 B2 * | 11/2002 | Thakar et al. | 426/43 |

OTHER PUBLICATIONS

Yun et al., "Mozzarella Cheese: Impact of Milling pH on Chemical Composition and Proteolysis", Journal of Dairy Science; vol. 76; No. 12; pp. 3629-3638; 1993.

* cited by examiner

*Primary Examiner*—Leslie Wong
(74) *Attorney, Agent, or Firm*—Townsend and Townsend and Crew LLP

(57) ABSTRACT

A process of making cheese, e.g., a mozzarella variety cheese, is disclosed. It comprises the following steps: a) preparing a cheese curd; b) grinding the curd while in admixture with (i) an aqueous solution of at least one cheese emulsifying salt and (ii) at least one GRAS food additive in the form of a comminuted solid, to obtain an emulsifier/additive-impregnated ground curd; and c) converting the emulsifier/additive-impregnated curd into cheese either by (i) heating, kneading, and stretching the emulsifier/additive-impregnated ground curd to obtain a homogeneous mass of cheese, or (ii) pressing the emulsifier/additive-impregnated ground curd to obtain a homogeneous mass of cheese. Examples of suitable GRAS food additives include gums, stabilizers, dairy solids (e.g., non-fat dry milk or whey protein concentrate), cheese powders, non-dairy protein isolates, sodium chloride, native or modified food starches, colorants, and flavorants. The process is particularly useful when a proteinaceous GRAS food additive is used.

25 Claims, No Drawings

US 7,169,429 B2

PROCESS OF MAKING A HOMOGENEOUS CHEESE

FIELD OF THE INVENTION

This invention relates to the preparation of a homogeneous cheese, for example a mozzarella variety of cheese. In particular, it relates to a process of making such a cheese in which a GRAS food additive, in the form of an undissolved solid, is added to the cheese curd.

DESCRIPTION OF RELATED ART

Homogeneous cheeses are often, if not generally, made by acidifying milk to convert it to a cheese milk, coagulating the cheese milk to obtain a coagulum comprised of curd and whey, cutting the coagulum and draining the whey therefrom, thereby leaving a cheese curd, and then forming the curd into a homogeneous mass of cheese. In one forming process the cheese curd is heated, kneaded, and stretched until it is a homogeneous, fibrous mass of cheese. In another forming process the cheese curd is pressed, for example in a cheddaring tower.

Sometimes it is desired to add a GRAS (generally recognized as safe) food additive to the curd to alter the properties of the final cheese, e.g., its taste, texture, color, or baking performance. In U.S. Pat. No. 6,120,809 (Rhodes), for example, a process is disclosed in which whey protein isolate and modified starch are mixed into mozzarella curd prior to heating, kneading, and stretching it. Often it is preferred to add the GRAS additive in the form of a comminuted solid. That can pose problems, however, in that it can be difficult to get the solid additive thoroughly blended into the finished cheese. Pockets or deposits of the additive sometimes survive the cheese-forming operation. They can be quite large, e.g., ½ inch to 4 inches in diameter. This is particularly true when the additive is proteinaceous. These deposits can be so large as to clog some of the equipment used in making the cheese. Even if small, the presence of such deposits detracts from the appearance and mouth feel of the cheese, and can adversely affect the taste as well. In addition, if the cheese is to be diced or shredded prior to consumption, as, for example, in the case of cheese that is to be baked, e.g., on a pizza, these deposits can sometimes become so hard as to damage the cutting blades. The result can be metal fragments in the comminuted cheese.

SUMMARY OF THE INVENTION

The present invention addresses this problem by using a process comprising the following steps to make a homogeneous cheese that is augmented by a GRAS food additive that is in the form of an undissolved solid:

a) preparing a cheese curd, b) grinding the curd while in admixture with (i) an aqueous solution of at least one cheese emulsifying salt and (ii) at least one GRAS food additive in the form of a comminuted solid, to obtain a ground curd that is impregnated with the emulsifying salt and the other GRAS food additive; and c) converting the emulsifier/additive-impregnated ground curd into cheese either by (i) heating, kneading, and stretching the emulsifier/additive-impregnated ground curd to obtain a homogeneous mass of cheese, or (ii) pressing the emulsifier/additive-impregnated ground curd to obtain a homogeneous mass of cheese.

DETAILED DESCRIPTION

The process of the present invention can be used in the manufacture of any cheese that is made by either pressing the curd or subjecting it to the heating/kneading/stretching process. It is believed to be most useful for the manufacture of cheeses that are designated as "Soft," "Firm/Semi-hard," or in between, according to the CODEX General Standard for Cheese (A6) Firmness Designators. These include, for example, Colby, Havarti, Monterey Jack, Gorgonzola, Gouda, Cheshire, and Muenster, all of which are in the Firm/Semi-hard category, as well as the mozzarella variety cheeses, which are in the Soft or Firm/Semi-hard categories, or in between the two. By "mozzarella variety cheese" we mean to include all of the cheeses that traditionally were prepared by the pasta filata process, which cheeses are known by a variety of names, including mozzarella, pasta filata, provolone, scamorze, and pizza cheese. Standard mozzarella is designated as a Soft cheese. Part-skim mozzarella is between Soft and Firm/Semi-hard. Low-moisture mozzarella and low-moisture part-skim mozzarella are both designated as Firm/Semi-hard.

How to prepare a suitable curd for making a pressed curd cheese or a heated/kneaded/stretched cheese is well known to those skilled in the art. Typically the curd is prepared from pasteurized cow's or buffalo milk. The acidification step can be performed either microbially or directly. Microbial acidification is accomplished by the addition of a starter culture of one or more lactic acid-producing bacteria to the milk, and then allowing the bacteria to grow and multiply. When making a mozzarella variety cheese, a bacterial starter culture composed of coccus, rods, or a combination of both is preferably used. Direct acidification is faster and is accomplished by the addition of a GRAS acid, such as, for example, acetic acid (e.g., as vinegar), phosphoric acid, citric acid, lactic acid, hydrochloric acid, sulfuric acid, or glucono-delta-lactone (GdL) to the milk.

Following acidification, it is conventional to add rennet to the milk, to enhance the coagulation activity. The resulting coagulum is cut, and the whey is drained. Typically the curd is scalded (cooked) for about 0.08 to 1.0 hours at about 30–48° C., and then is subjected to either the cheddaring process or the heating/kneading/stretching operation.

The term "cheese emulsifying salt" intended to include (but not be limited to) the chemical compounds known as sequestrants. Preferably what is used is a cheese emulsifier that sequesters calcium ions in the cheese—i.e., reduces the degree to which the calcium is ionically bound to the protein in the cheese. Calcium-binding emulsifying salts are preferred, particularly those selected from the group consisting of phosphates and citrates. Sodium, sodium aluminum, and potassium salts are most preferred. Examples of suitable phosphates are sodium hexametaphosphate (SHMP), monosodium phosphate (MSP), sodium tripolyphosphate (STPP), disodium phosphate (DSP), potassium tripolyphosphate (KTP), potassium polyphosphate (KPP), and potassium tetrapolyphosphate (KTPP). DSP is generally available in its hydrated form, disodium phosphate dihydrate. The preferred citrate emulsifier is sodium citrate, which, in solid form, is generally commercially available as sodium citrate dihydrate.

The ideal amount of emulsifying agent to use will vary, depending upon its chemical identity and the other combination of cheese-making conditions employed, but it can be easily ascertained on a case-by-case basis with a slight amount of experimentation. Preferably, however, the emulsifying agent will be used in an amount within the range of about 0.01 to 2%, based on the weight of the curd. Often, about 0.1 to 0.7% of the emulsifying agent will be used, or an amount within the range of about 0.2 to 0.6%.

The solution of cheese emulsifying salt preferably contains about 5 to 50 weight percent of dissolved salt, often about 20 to 40 weight percent thereof.

Among the GRAS food additives that may be present with the curd and aqueous solution of emulsifying salt in the grinder are gums, stabilizers, dairy solids, cheese powders, non-dairy protein isolates, sodium chloride, potassium chloride, native or physically or chemically modified food starches, food colorants, and food flavorants.

The incorporation of a gum and/or stabilizer in the cheese is generally useful to bind water and firm the cheese body. Examples of suitable gums include xanthan gum, guar gum, and locust bean gum. Examples of suitable stabilizers include chondrus extract (carrageenan), pectin, gelatin, and alginate, with alginate being generally preferred. The total amount of gums and stabilizers added will generally be in the range of about 0.1 to 10%, e.g., about 1 to 4%, based on the weight of the curd The purpose of incorporating a dairy solid into the cheese in the process of the present invention is to firm the cheese, bind water, improve the melt appearance of the cooked cheese, and/or to increase the blistering of the cooked cheese. Examples of suitable dairy solids include, but are not limited to, whey protein concentrate, dried whey, whey protein isolate, delactose permeate, casein hydrolyzate, milkfat, lactalbumin, and nonfat dry milk. The dairy solids may generally be included in an amount within the range of about 0.1 to 15%, e.g., about 1 to 8%, based on the weight of the curd.

A cheese powder is a dried cheese in particulate form. The purpose of incorporating a cheese powder in the cheese is to impart a different cheese flavor to the finished product. Examples of suitable cheese powders include, but are not limited to, Parmesan, cheddar, Monterey Jack, Romano, Muenster, Swiss, and provolone powders. The cheese powder can generally be included in an amount within the range of about 0.25 to 10%, preferably about 0.25 to 1%, based on the weight of the curd.

The purpose of incorporating a non-dairy protein isolate into the cheese in the process of the present invention is to alter the texture of the cheese and/or to change the size, color, or integrity of the blisters that are formed when the cheese is baked on a pizza, as well as other cook characteristics. Examples of suitable non-dairy protein isolates include soy protein (sometimes called "soy powder"), gelatin, wheat germ, corn germ, gluten, and egg solids. (Gelatin, as previously indicated, also acts as a stabilizer to bind water and firm the cheese.) The amount of non-dairy protein isolate that might be added will generally be within the range of about 0.1 to 10 percent, e.g., about 1 to 4%, based on the weight of the curd.

If sodium chloride and/or potassium chloride is mixed with the curd during the grinding operation, preferably the total amount of those salts will be about 0.1 to 5%, e.g., about 0.1 to 2%, based on the weight of the curd.

Sometimes, when the exposed cheese on a pizza completely melts, it appears as though the cheese has been "cooked into" sauce. To the consumer, the topping on the pizza can appear to have less cheese than is desired or expected. In the industry this is referred to as the pizza appearing "thin" having a "poor yield." The inclusion of a food starch in the cheese tends to obviate this problem. Generally the amount of starch should be in the range of about 0.5 to 20%, most commonly in the range of about 1 to 4%, based on the weight of the curd.

Suitable starches include both vegetable starches, such as potato starch, pea starch, and tapioca, and grain starches, such as corn starch, wheat starch, and rice starch. The starch can be modified (chemically or physically) or native. Suitable corn starches include dent corn starch, waxy corn starch, and high amylose corn starch.

Modified food starches differ in their degree of cross-linking, type of chemical substitution, oxidation level, degree of molecular scission, and ratio of amylose to amylopectin. Examples of some commercially available modified food starches that are generally suitable for obviating the "poor yield" problem include Mira-Cleer 516, Pencling 200, Batterbind SC, Penbind 100, and MiraQuick MGL. A suitable, commercially available native (unmodified) starch is Hylon V.

Mira-Cleer 516, from A. E. Staley Company, is a dent corn starch that is cross-linked and substituted with hydroxypropyl groups. The cross-linking increases its gelatinization temperature and acid tolerance. The hydroxypropyl substitution increases its water binding capability, viscosity and freeze-thaw stability.

MiraQuick MGL, from A. E. Staley Company, is an acid-thinned potato starch. The acid thinning breaks amylopectin branches in the starch, creating a firmer gel.

Pencling 200, from Penwest Foods, is an oxidized potato starch. The oxidation increases its capacity to bind water and protein. Penbind 100, also from Penwest Foods, is a cross-linked potato starch.

Batterbind SC, from National Starch, is a cross-linked and oxidized dent corn starch. Hylon V, also from National Starch, is an unmodified, high amylose corn starch.

All of the specific starches mentioned above are "cook-up" starches—that is, they are not pre-gelatinized. Pre-gelatinized starches can also be used in the process of the present invention.

As suitable food flavorants may be mentioned, for example, powdered butter and cheddar cheese flavorants.

Powdered food colorants come in a variety of colors and can be used to impart a creamier, richer color to the finished cheese or even a non-cheeselike novelty color.

In order to adjust the composition of the finished cheese, a minor amount of water and/or dairy cream also can be in an admixture with the curd during the grinding step. Adding a metered amount of either can assist in the effort to control the moisture and/or milkfat content of the finished cheese. This can be done, for example, by use of an additional spray line at the inlet to the grinder. The amount of added water or cream preferably will not be more than can be absorbed by the curd—i.e., not so much as to result in separation of the water and/or cream from the curd, after the mixture leaves the grinder.

The grinding reduces the curd to smaller size particles, thus increasing its surface area. Preferably, the curd is ground to an extent that at least about 90 weight percent thereof has a particle size with a longest dimension of no more than about 0.5 inch, and most preferably no more than about 0.3 inch. Most preferably, substantially all of the curd will have such a particle size.

A preferred type of grinding machine is one in which the curd is swept by high speed impellers around the inside of a stationary circular wall with exit slots having a knife blade mounted in front of each slot opening, parallel to the wall, with the blade edge facing the onrushing curd. Due to centrifugal force, the curd hugs the wall as it is swept past the blades. As a piece of curd is forced past an exit slot, it is sliced by the blade and the sliced-off segment is propelled out the slot. By setting the distance between the blade and the wall, the cheese curd is reduced in size by precise increments and can be ground to a predetermined size. One suitable example of such a grinder is the Urschel Comitrol Processor, model 1700, with variable speed control, which has three blades and a dogleg impeller. Using this particular machine, the preferred impeller speed is about 3600 to 5600 rpm.

Preferably the grinding step is performed in a continuous manner. Thus, for example, the grinding machine can have an upwardly open inlet and the supply curd can be made to fall into the grinder in a continuous stream, while the grinder is operating. In such an arrangement it is preferred that the aqueous solution of emulsifying salt be sprayed onto the falling curd. Similarly, the GRAS food additive solids can be made to fall into the same inlet, at a location on or near the location where the supply curd falls into the grinder. One example of a suitable machine for introducing the powdered GRAS food additive into the grinding chamber is an Allen Machinery Company salter/seasoner applicator, model no. ss66.5/36.

When the emulsifier/additive-impregnated ground curd is to be formed into a cheese by heating, kneading, and stretching, the heating/kneading/stretching machine may be, for example, a single or twin-screw mixer or a twin-screw extruder, either fitted for steam injection or having a heated jacket, or a combination of both. When using a twin-screw mixer or extruder as the heating/kneading/stretching machine, preferably the screws (also known as augers) will be arranged so that they overlap, to insure thorough mixing.

Preferably, the heating, kneading, and stretching will be performed under low shear conditions. Thus, for example, when using a twin-screw mixer having a ¼ inch clearance between the outer edge of each flight and the wall past which that edge moves, the speed of revolution of the screws will preferably be no more than about 50 rpm, e.g., in the range of about 12 to 40 rpm. Wider clearances can be used as well, e.g., up to, say, ½ inch.

The heating of the curd while it is being kneaded and stretched can be accomplished; for example, by conduction, through the wall of the kneading and stretching chamber, e.g., by use of a hot water jacket. In addition to or instead of conductive heating, the contents of the chamber can be heated by releasing live steam into the kneading and stretching chamber. Where live steam is used to heat the curd, the steam condensate is absorbed by the curd and forms part of the final mass of cheese. When using live steam in the heating/kneading/stretching machine, typically the water content of the emulsifier/additive-impregnated ground curd immediately prior to entering the mixer is about 45 to 55 wt. %, and sufficient steam is released into the kneading and stretching chamber that the water content of the mass of cheese immediately after exiting the machine is up to about 5 percentage points higher, e.g., about 0.5 to 5 points higher. Often, it will be about 1.5 to 2.5 points higher. Thus, for example, if, say, the water content of the ground curd entering the machine is 45 wt. %, then preferably the amount of injected steam that is used to bring the curd up to the necessary temperature to obtain a homogeneous, fibrous mass of cheese will be an amount that raises the water content to no more than about 47 wt. %.

When the emulsifier/additive-impregnated ground curd is subjected to a heating/kneading/stretching operation, it is preferred that that too be performed on a continuous basis. Thus, for example, the emulsifier/additive-impregnated curd that is discharged from the grinder can be continuously collected in a funnel, passed into a flowline, and pumped to a heating/kneading/stretching machine that is in operation. As the ground curd is introduced at one location into the heating/kneading/stretching chamber, finished cheese can be continuously withdrawn from another location in the chamber.

The heating, kneading, and stretching step can be performed in the absence of any exogenous water. By "exogenous water" is meant water that is used to bathe the curd and which is subsequently separated from the homogeneous cheese. A shortcoming of the use of exogenous water during the heating, kneading, and stretching step is that, when the water is separated, it removes valuable protein, fat, and other solids that otherwise would be bound up in the finished cheese.

The emulsifier/additive-impregnated ground curd that is withdrawn from the grinder is preferably at a temperature of about 70 to 120° F., and often within the range of about 85 to 105 or 110° F. Typically that ground curd will then be heated in the heating/kneading/stretching machine to an exit temperature in the range of about 120 to 150° F., preferably about 130 to 145° F.

The hot cheese that exits the heating/kneading/stretching machine may be packaged either before or after being cooled to room temperature or below. No special type of cooling is required. Thus, for example, the cheese can be cooled by extruding it from the heating/kneading/stretching machine directly into a cold water or cold sodium chloride brine channel or tank, for example as described in U.S. Pat. No. 4,339,468 to Kielsmeier or U.S. Pat. No. 5,200,216 to Barz et al., both of which are hereby incorporated herein by reference.

Instead of floating or immersing the cheese in cold water or brine to cool it, it can be sprayed with cold brine or water and/or passed through a cold air chamber, e.g., a blast cooler.

When extruding the hot cheese and cooling it while in ribbon form, the cheese ribbon is preferably contacted with the cooling medium (e.g., cold water, brine, or air) until its core temperature drops to about 75° F. (24° C.) or below. Then the cooled ribbon is cut into segments. The cheese ribbon can even be cooled to a core temperature of about 25° F. (−3.9° C.) or below before being cut.

If the product is string cheese, e.g., having a diameter of about ¼ to ¾ inch (0.6 to 2 cm.), the segments of the string will generally be about 1½ to 8 inches (4 to 20 cm.) long. If the string cheese is not to be baked, or if it is to be baked only while enclosed in pizza crust, e.g., in a stuffed crust pizza, it will generally not be necessary to age the cheese before using it. If desired, the string cheese may be frozen and stored.

If it is intended to use the cheese as exposed topping for a pizza, then the continuous ribbon, which will preferably be rectangular in cross section, may be cut into loaves, for example having a width of about 12 to 36 inches (30 to 91 cm.), a height of about ¹⁄₁₆ to 2 inches (0.15 to 5 cm.), and a length of about 14 to 24 inches (36 to 61 cm.). The loaves can be comminuted. Preferably the loaves will have a core temperature at or below 30° F. prior to being comminuted. The resultant pieces of cheese can be individually quick frozen, for example by the process described in U.S. Pat. No. 5,030,470 to Kielsmeier, et al., which is hereby incorporated herein by reference.

If, instead of being heated, kneaded, and stretched, the emulsifier/additive-impregnated ground curd is transformed into a homogeneous cheese by pressing, then it can be continuously conveyed from the grinder to a cheddaring tower in which the mixture is not heated, but rather pressed into blocks, e.g., ranging in size from about 5 to about 640 lbs. Even mozzarella variety cheeses can be made by the pressed curd process, as disclosed, for example, in U.S. Pat. No. 6,086,926 (Bruce et al.), which is hereby incorporated herein by reference. As discussed in Bruce et al., when using the pressed curd process it is preferred to treat the curd with a proteolytic enzyme, so as to impart stretching properties to the finished cheese. Preferably, the enzyme is added together with salt, and the treated curd is allowed about 3 to 48 hours, at a temperature of about 15 to 40° C., to incorporate the salt and enzyme (mellowing) before the curds are filled into moulds and placed into a cheese process. Typically the pressing is continued overnight, e.g., under a pressure of about 40 lb/in$^2$ (280 kPa) and at ambient temperature.

Depending on the composition of the cheese, if it is intended to be used for baking purposes it may be preferable to store the cheese for a time (e.g., about 7 to 21 days, at about 35 to 45° F. (2 to 7° C.)) after it is removed from the cooling medium and before it is comminuted and frozen. However, as described in U.S. Pat. No. 5,200,216 (Barz et al.), if the process is controlled so that the cooled cheese removed from the cooling medium has a moisture content of about 45 to 60 wt. %, a milkfat content of at least about 30 wt. % (dried solids basis), and a combined moisture and wet milkfat content of at least about 70 wt. %, then the cheese can be frozen immediately and will still perform satisfactorily when baked on a pizza, under a variety of conditions.

When the process of the present invention is used to make standard mozzarella cheese, steps (a) through (c) are controlled so that the cheese obtained has a minimum milkfat content of 45% by weight of the solids and a moisture content that is more than 52 wt. % but not more than 60 wt. %.

When the present process is used to make low-moisture mozzarella cheese, steps (a) through (c) are controlled so that the cheese obtained has a minimum milkfat content of 45% by weight of the solids and a moisture content that is more than 45 wt. % but not more than 52 wt. %.

When the process of the present invention is used to make part-skim mozzarella cheese, steps (a) through (c) are controlled so that the cheese obtained has a milkfat content of 30 to 45% by weight of the solids and a moisture content that is more than 45 wt. % but not more than 60 wt. %.

When the process of the present invention is used to make low-moisture, part-skim mozzarella cheese, steps (a) through (c) are controlled so that the cheese obtained has a milkfat content of less than 45% but not less than 30%, by weight of the solids, and a moisture content that is more than 45% but not more than 52% by weight.

The moisture percentages given above are for bound plus free water—i.e., the percent of weight lost when the cheese is dried overnight in a 200° C. oven.

ILLUSTRATIVE EXAMPLES

The following examples illustrate how the process of the present invention may be performed. Unless otherwise indicated, all percentages are by weight.

Example I

Mozzarella cheese curd is made from cow's milk, using the overnight-curd-hold system described in U.S. Pat. No. 3,961,077 (Kielsmeier). A starter culture containing lactobacillus and streptococcus organisms is used, and the cheese milk is coagulated by the addition of veal rennet. Most of the individual curd particles range in size from about ½ inch to 1½ inches, in their longest dimension.

Approximately 9,500 lbs. of the cheese curd, having a moisture content of 54.33 wt. %, a milkfat content of 53.65 wt. % FDB (fat on a dry basis) and a pH of 5.61 is passed continuously thru a grinder (Urschel Laboratories, Inc., Valparaiso, Ind./Comitrol Processor Model 1700). The grinder is fitted with a cutting head (part number 3M025040U) set to produce a particle size of 0.04 inch. Simultaneously, as the curd falls into the grinder, 1.14% (based on the weight of the curd) of an emulsifier solution is sprayed onto the curd, and a blend of 0.8% salt (sodium chloride), 1.16% modified food starch (Mira-Cleer 516), and 1.16% NFDM (non-fat dry milk), based on the weight of the finished cheese, is sprinkled onto the sprayed curd. The emulsifier solution is a 0.45 wt. % solution of sodium polyphosphate glass in water. The curd and ingredients are in contact with each other for only a fraction of a second before landing in the grinder.

The ground mixture of curd and ingredients, at a temperature of about 80° F., is captured in a funnel as it is expelled from the grinder. The mixture is then pumped and passed through a series of two, hot-water-jacketed, single-screw mixers running at 12 rpm and a jacket temperature of 165° F. The mixture is heated to 112° F. in the first single auger-mixer and 133° F. in the second single-auger mixer. The heated mixture begins to take on a fibrous consistency but is not homogeneous yet. The heated mixture is then transferred to a hot-water-jacketed, double-auger mixer running at 22 rpm and a jacket temperature of 145° F. It is in this double auger mixer that a homogeneous, fibrous mass is created.

The homogeneous, fibrous mass of cheese (143° F.) is transferred to an extruder. The cheese is extruded into cold brine, where the temperature is dropped from 140° F. to 30° F. in 15–20 minutes. Final product specifications are 58.10% moisture, 45.34% FDB, 5.56 pH, and 1.80% salt. The cooled cheese is shredded, and then frozen. Upon thawing and baking the thawed cheese on pizza, it performs comparable to traditionally made cheese, and even shows signs of more meltdown. More important is the fact that no pockets or lumps of powder are found in the cheese that might cause dicer blade damage.

Example II

Approximately 9,500 lbs. of cheese curd having 52.52% moisture, 52.00% FDB and a pH of 5.62 is passed continuously thru the Comitrol Processor Model 1700 grinder. It is made in the same manner as the curd used in Example I. The grinder is fitted with a cutting head (part number 3M030250U) set to produce a particle size of 0.25 inch. Simultaneously, as the curd falls into the grinder, 0.75 wt. % of an emulsifier solution is sprayed onto the curd, and a blend of 0.8% salt and 4.0% NFDM, based on the weight of the finished cheese, is sprinkled onto the sprayed curd, in the same manner as in Example I. The emulsifier solution is again a 0.45 wt. % solution of sodium polyphosphate glass in water.

The ground mixture of curd and ingredients, at a temperature of about 80° F., is captured in a funnel as it is expelled from the grinder. The mixture is then pumped and passed through an unheated twin-screw mixer running at 80 rpm. The mixture is then transferred to a hot-water-jacketed, double-auger mixer running at 12 rpm and a jacket temperature of 155° F. The heated mixture takes on some fibrous characteristics but is not homogeneous yet. The heated mixture is then transferred to a hot-water-jacketed, single auger mixer running at 12 rpm and a jacket temperature of 150° F. It is in this single auger mixer that a homogeneous, fibrous mass is created.

The homogeneous, fibrous mass of cheese (130° F.) is transferred to an extruder. The cheese is extruded into cold brine, where the temperature is dropped from 140° F. to 30° F. in 15–20 minutes. Final product specifications are 58.10% moisture, 45.34% FDB, 5.56 pH, and 1.80% salt. The cooled cheese is shredded, and then frozen. Upon thawing and baking the thawed cheese on pizza, it performs comparable to traditionally made cheese, and even shows signs of more meltdown. More important is the fact that no pockets or lumps of powder are found in the extruded cheese which might cause dicer blade damage.

Example III

Approximately 9,500 lbs. of cheese curd having a moisture content of 52.52%, 52.00% FDB and a pH of 5.62 is passed continuously thru the Comitrol Processor Model 1700 grinder. The grinder is fitted with a cutting head (part number 66793) set to produce a particle size of 0.025 inch. Simultaneously, as the curd falls into the grinder, 0.75 wt. % of an emulsifier solution (0.45 wt. % sodium polyphosphate glass) is sprayed onto the curd, and a blend of 1.0% salt and 4.0% NFDM, based on the weight of the finished cheese, is sprinkled onto the sprayed curd, in the same manner as in Example I.

The mixture is then pumped to a twin-screw mixer. The mixture is continuously moved through three chambers in the mixer, each chamber having independent temperature control via jacketed hot water. Also, all of the screws are heated by hot-water (150° F.) that flows through passages through both the flights and the axles. The temperature of the water flowing through the jacket of the first chamber is approximately 110° F., that flowing through the second chamber's jacket is about 175° F., and that flowing through the third chamber's jacket is about 160° F. The trip through the three chambers raises the temperature of the cheese mixture from 80° F. to 150° F. Towards the end of its residence time in the second chamber, the cheese mixture begins to stretch, such that upon exiting the third chamber it is a homogeneous, fibrous mass.

The homogeneous, fibrous mass of cheese is transferred to an extruder. The cheese is extruded into cold brine, where the temperature is dropped from 140° F. to 30° F. in 15–20 minutes. Final product specifications are 51.8% moisture, 41.5% FDB, 5.64 pH and 1.73% salt. The cooled cheese is shred, and then frozen. No pockets or lumps of powder are present in the cheese.

We claim:

1. A process of making a mozzarella variety cheese comprising the following steps:
    a) preparing a cheese curd,
    b) grinding the curd while in admixture with (i) an aqueous solution of at least one cheese emulsifying salt and (ii) at least one GRAS food additive, to obtain an emulsifier/additive-impregnated ground curd; and
    c) converting the emulsifier/additive-impregnated ground curd into cheese either by (i) heating, kneading, and stretching the emulsifier/additive-impregnated ground curd to obtain a homogeneous mass of cheese, or (ii) pressing the emulsifier/additive-impregnated ground curd to obtain a homogeneous mass of cheese.

2. The process of claim 1, wherein steps (a) through (c) are controlled so that the cheese resulting from step (c) has a moisture content of at least about 45 weight percent.

3. The process of claim 2, wherein steps (a) through (c) are controlled so that the cheese resulting from step (c) has a milkfat content of at least 30 weight percent of the solids.

4. The process of claim 3, wherein steps (a) through (c) are controlled so that the cheese resulting from step (c) is in a Codex General Firmness category selected from the group consisting of Soft, Firm/Semi-hard, and in between Soft and Firm/Semi-hard.

5. The process of claim 4, wherein steps (a) through (c) are controlled so that the cheese resulting from step (c) is fibrous.

6. The process of claim 5, wherein step (c) is performed by heating, kneading, and stretching the emulsifier/additive-impregnated ground curd, while in the absence of exogenous water, to obtain a homogeneous fibrous mass of cheese.

7. The process of claim 6, wherein the at least one GRAS food additive is selected from the group consisting of gums, stabilizers, dairy solids, cheese powders, non-dairy protein isolates, sodium chloride, potassium chloride, native food starches, chemically modified food starches, physically modified food starches, food colorants, and food flavorants.

8. The process of claim 7, wherein the at least one GRAS food additive is proteinaceous.

9. The process of claim 8, wherein the at least one GRAS food additive is selected from the group consisting of dairy solids and non-dairy protein isolates.

10. The process of claim 9, wherein, in step (b), the amount of cheese emulsifying salt present in the mixture is about 0.01 to 2 percent, based on the weight of the curd.

11. The process of claim 10, wherein, in step (b), the solution contains about 5 to 50 wt. % of dissolved cheese emulsifying salt.

12. The process of claim 11, wherein, in step (b), the curd is in admixture with about 0.1 to 10 percent of proteinaceous GRAS food additive in the form of a comminuted solid.

13. The process of claim 12, wherein step (b) is performed by simultaneously and continuously supplying the curd, emulsifying salt solution, and GRAS food additive to an operating grinder, while simultaneously and continuously withdrawing emulsifier/additive-impregnated ground curd from the grinder.

14. The process of claim 13, wherein, in step (b), the curd is ground to the extent that at least 90 weight percent thereof has a particle size with a longest dimension of no more than 0.5 inch.

15. The process of claim 14, wherein the emulsifier/additive-impregnated ground curd that is withdrawn from the grinder is at a temperature of about 70 to 120° F.

16. The process of claim 15, wherein step (c) is performed by continuously passing the emulsifier/additive-impregnated ground curd through an operating twin-screw mixer in which the curd is heated to an exit temperature in the range of about 120 to 150° F., while the curd is being kneaded and stretched by the turning of the mixer screws.

17. The process of claim 16, wherein, in step (b), the grinder has an upwardly open inlet, and a continuous stream of the supply curd is made to fall into that inlet while the emulsifier salt solution is sprayed onto the falling curd.

18. The process of claim 17, wherein, in step (b), a continuous stream of the proteinaceous GRAS food additive, in powdered form, is made to fall into the grinder at or near the location where the supply curd falls into the grinder.

19. The process of claim 12, wherein the at least one cheese emulsifying salt is a phosphate or citrate salt.

20. The process of claim 19, wherein the at least one cheese emulsifying salt is a sodium, sodium aluminum, or potassium salt.

21. The process of claim 12, wherein the at least one cheese emulsifying salt is selected from the group consisting of sodium citrate, potassium tetrapolyphosphate, potassium tripolyphosphate, potassium polyphosphate, sodium hexametaphosphate, monosodium phosphate, sodium tripolyphosphate, and disodium phosphate.

22. The process of claim 21, wherein the proteinaceous GRAS food additive is selected from the group consisting of non-fat dry milk, dried whey, whey protein concentrate, whey protein isolate, and soy protein isolate.

23. The process of claim 22, wherein steps (a) through (c) are controlled so that the cheese obtained has a minimum milkfat content of 45 percent by weight of the solids and a moisture content that is more than 52 weight percent but not more than 60 weight percent.

24. The process of claim 22, wherein steps (a) through (c) are controlled so that the cheese obtained has a milkfat content of 30 to 45 percent by weight of the solids and a moisture content that is more than 45 weight percent but not more than 60 weight percent.

25. The process of claim 13, wherein, in step (b), the curd is ground to the extent that at least 90 weight percent thereof has a particle size with a longest dimension of no more than 0.3 inch.

* * * * *